(No Model.) 4 Sheets—Sheet 1.

E. NORTON.
APPARATUS FOR MANUFACTURING TIN PLATE.

No. 535,395. Patented Mar. 12, 1895.

(No Model.)  4 Sheets—Sheet 2.

E. NORTON.
APPARATUS FOR MANUFACTURING TIN PLATE.

No. 535,395. Patented Mar. 12, 1895.

WITNESSES:

INVENTOR:
EDWIN NORTON
By Munday, Evarts & Adcock.
HIS ATTORNEYS.

(No Model.) 4 Sheets—Sheet 3.
E. NORTON.
APPARATUS FOR MANUFACTURING TIN PLATE.
No. 535,395. Patented Mar. 12, 1895.
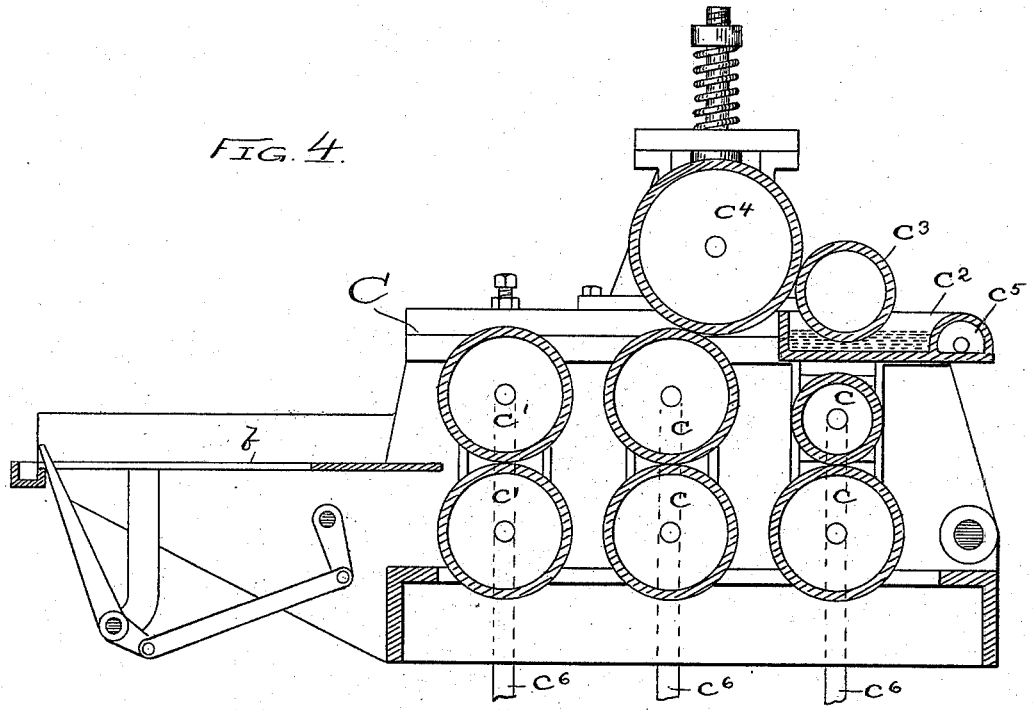
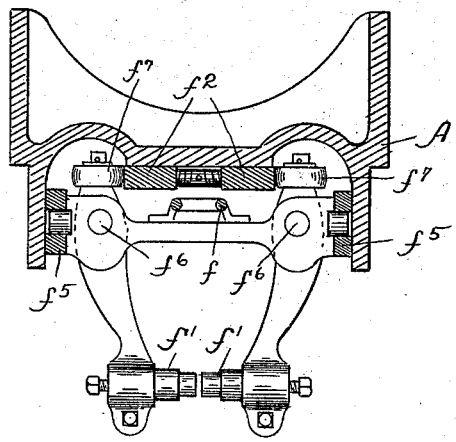
WITNESSES:
Geo. E. Curtis
A. W. Munday,
INVENTOR:
EDWIN NORTON.
By Munday, Evarts & Adcock.
HIS ATTORNEYS.

(No Model.) 4 Sheets—Sheet 4.

E. NORTON.
APPARATUS FOR MANUFACTURING TIN PLATE.

No. 535,395. Patented Mar. 12, 1895.

WITNESSES:
Lew. E. Curtis
H. W. Munday

INVENTOR:
EDWIN NORTON.
BY Munday, Evarts & Adcock.
HIS ATTORNEYS.

UNITED STATES PATENT OFFICE.

EDWIN NORTON, OF MAYWOOD, ASSIGNOR TO THE NORTON BROTHERS, OF CHICAGO, ILLINOIS.

APPARATUS FOR MANUFACTURING TIN-PLATE.

SPECIFICATION forming part of Letters Patent No. 535,395, dated March 12, 1895.

Application filed June 18, 1894. Serial No. 514,901. (No model.)

*To all whom it may concern:*

Be it known that I, EDWIN NORTON, a citizen of the United States, residing in Maywood, in the county of Cook and State of Illinois, have invented a new and useful Improvement in Apparatus for Manufacturing Tin-Plate, of which the following is a specification.

My invention relates to the manufacture of tin plate.

The object of my invention is to produce an improved apparatus or combined machine for manufacturing tin plate which will operate to continuously and automatically dry and flux the wet pickled sheets of iron or steel, to tin them, to lift them from the tinning pot and cool them, to clean the tinned sheets from the oil while they are still warm or hot, and finally to dust and polish them while still hot or warm, all these steps being performed continuously in the combined machine without hand labor.

My invention consists in the combination in one complete machine or apparatus of a device or mechanism for automatically feeding the wet pickled sheets one by one, a device or mechanism for drying and fluxing the wet pickled sheets, a device or mechanism for tinning the fluxed sheets automatically, a device or mechanism for lifting or conveying the sheets from the tinning pot as they issue therefrom, said lifting device operating to hold the sheets suspended the necessary interval of time for cooling the sheets sufficiently to allow the tin coating thereon to become set, a device or mechanism for cleaning the sheets, and a device or mechanism for polishing the tinned sheets, all these different parts or devices of the machine being combined together and co-operating one with another, so that the sheets pass successively and continuously through the entire machine without the necessity of any intermediate handling or hand labor.

Figure 1:
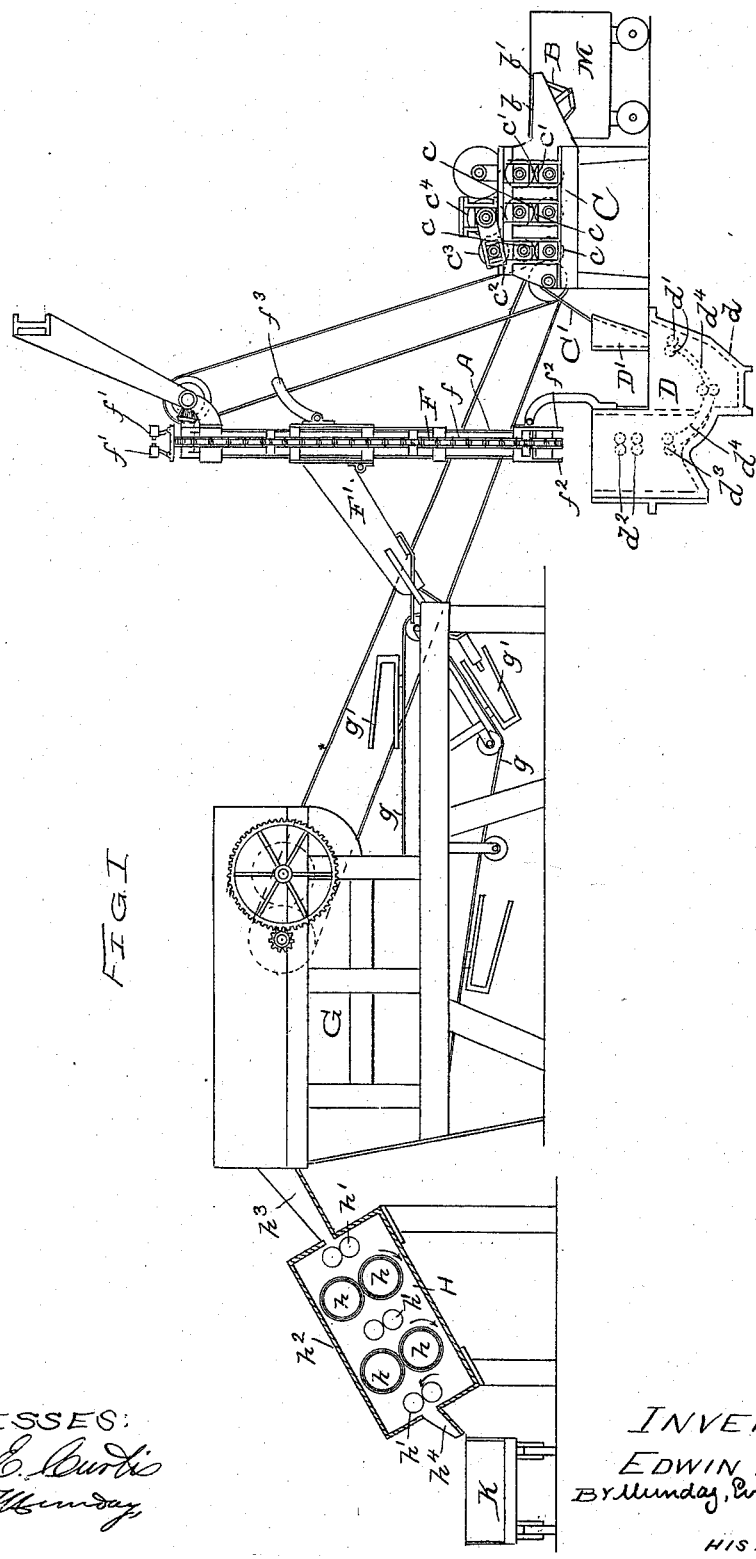
Figure 2:
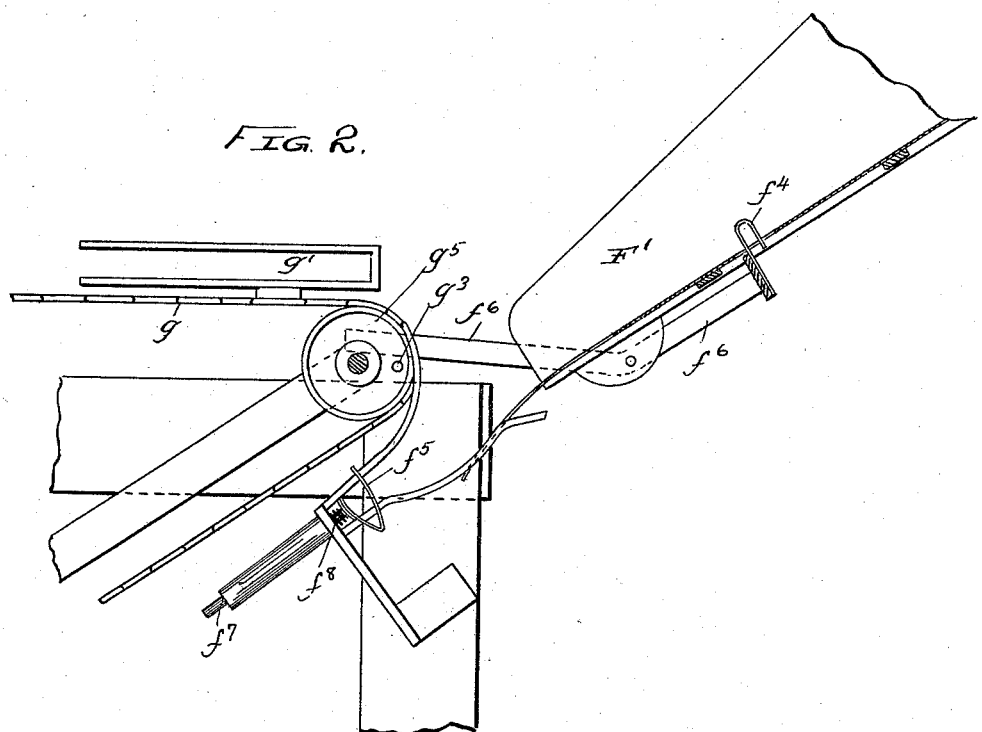
Figure 3:
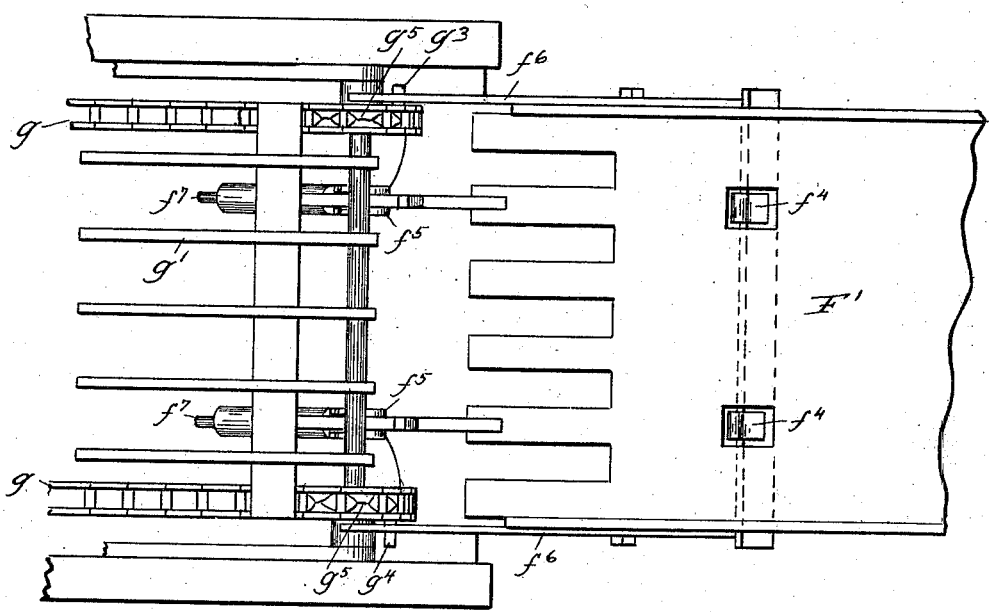
Figure 5:
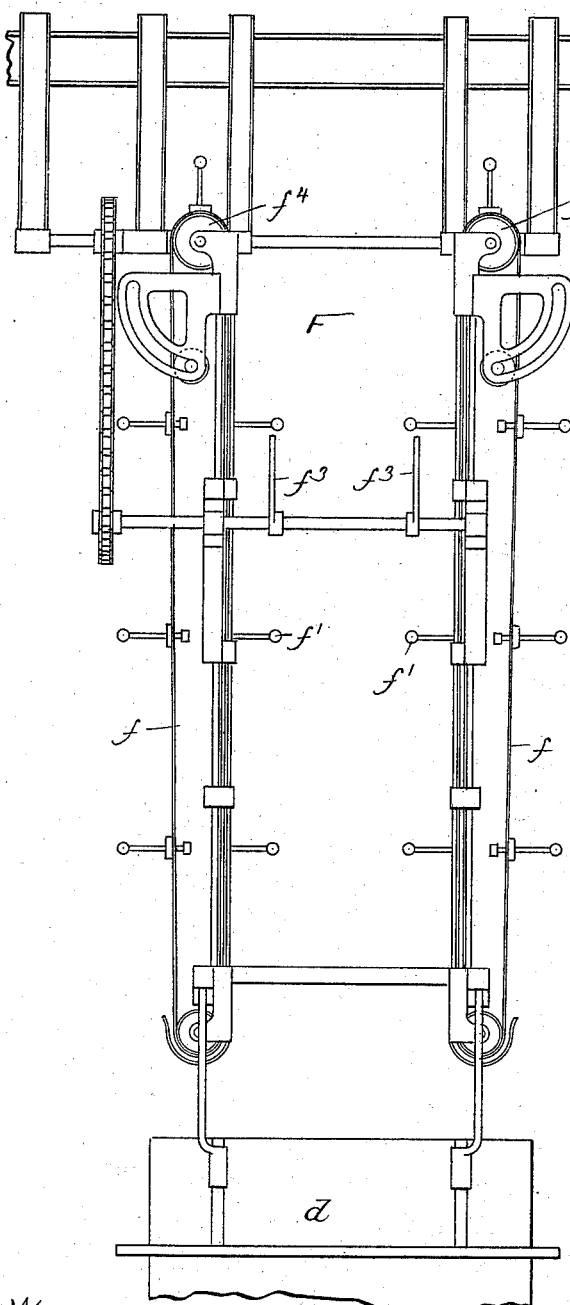
Figure 6:
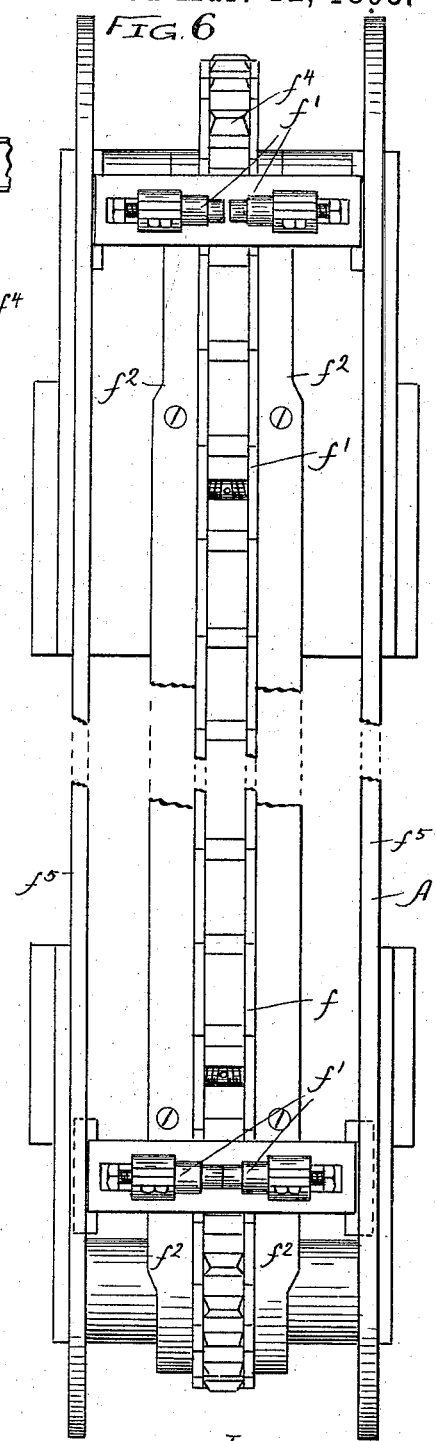

In the accompanying drawings which form a part of this specification, and in which similar letters of reference indicate like parts, Figure 1 is a side elevation of a machine or apparatus embodying my invention. Figs. 2 and 3 are enlarged detail views of a part of device hereinafter described. Fig. 4 is a detail vertical sectional view of the sheet drying and fluxing mechanism, and Figs. 5, 6 and 7 are enlarged detail views of the lifting and cooling mechanism.

In the drawings A represents the frame of the apparatus or machine.

B is the device or mechanism for automatically feeding the sheets one by one to the machine. This sheet feeding mechanism may be of any suitable kind or construction known to those skilled in the art and which will operate to automatically feed the sheets forward one by one successively at suitable intervals. The sheet feed device or mechanism which I prefer to employ however consists of a table $b$ in connection with one or more vibratory feed arms $b'$, as indicated in the drawings.

C is the drying and fluxing device by which the water or moisture is driven off the wet pickled sheets and the same coated on both sides with palm oil or other suitable flux. This drying and fluxing device or mechanism may be of any suitable kind or construction known to those skilled in the art, but that which I prefer to employ is indicated in the drawings and consists of two pairs of hollow steam heated fluxing rolls $c$ $c$ and $c$ $c$ and a pair of hollow steam heated drying rolls $c'$ $c'$ in conjunction with a flux tank $c^2$, a flux feed roll $c^3$ revolving in the flux tank and a transfer roll $c^4$ revolving in contact with the flux feed roll $c^3$ and one of the fluxing rolls $c$.

The flux tank $c^2$ has a hollow steam heated chamber $c^5$ for heating the palm oil or flux contained in said tank. The flux tank $c^2$ is located above the path of the sheets of iron or steel through the machine, and preferably directly above one pair of fluxing rolls $c$ $c$, substantially as indicated in the drawings.

The flux feed roll $c^3$ revolving in the flux tank $c^2$ is partially immersed in the oil or flux and serves to feed or supply the flux to the fluxing rolls through the medium of the transfer roller $c^4$ which revolves in contact with the flux feed roll $c^3$ and also in contact with the upper one of the first pair of fluxing rolls $c$ $c$, by which fluxing roll the flux or oil is transferred to the surface of the other fluxing rolls by direct contact therewith or by contact with the sheet to the upper and lower surfaces of which the flux or oil has been transferred by the first pair of fluxing rolls $c$ $c$.

The pair of steam heated rolls $c'$ $c'$ adjacent to the feed table $b$ are preferably used simply as drying rolls, and no flux or oil need be supplied to them.

$c^6$ $c^6$ are the steam pipes connected to the several pairs of hollow heated fluxing and drying rolls by suitable stuffing boxes, and also communicating with the steam chamber $c^5$ of the flux tank. As the sheets are automatically fed at intervals, or intermittently, by the sheet feed device they pass at intervals between the pairs of drying and fluxing rolls, so that the flux supplied to the surface of the upper one of the first pair of fluxing rolls by the flux feed roller, may be transferred to the surface of the lower fluxing roll of this first pair at the intervals between the successive sheets, at which intervals the upper and lower fluxing rolls are in direct contact with each other.

D is the tinning device or mechanism. The tinning device or mechanism may be of any suitable kind or construction familiar to those skilled in the art, but that which I prefer to employ in my combined machine is indicated in the drawings, and consists essentially of a tinning pot $d$ furnished with tinning rolls $d'$ $d'$, finishing rolls $d^2$ $d^2$, intermediate rolls $d^3$ $d^3$ and guides $d^4$ for conveying and guiding the sheets through the tinning pot. The tinning pot is also provided with a hopper, chute or feed passage D' connecting with or forming a part of the chute or feed passage C' by which the sheets are successively and automatically conveyed or passed from the fluxing mechanism C to the tinning mechanism D.

F is the device for lifting or conveying the sheets successively one by one as they issue from the tinning pot and supporting or suspending the same a sufficient length of time to allow the molten tin upon the surfaces of the sheets to become cooled or set. The sheet lifting and cooling mechanism F may be of any suitable kind or construction known to those skilled in the art which will operate to take the sheets successively and automatically as they issue from the tinning pot and hold or support them in the air a sufficient time for the molten tin to become set on the surfaces of the sheets; but that which I prefer to employ in my combined machine or apparatus is the mechanism indicated in the drawings and consists essentially of an endless link chain carrier $f$ furnished with a series of pairs of opening and closing fingers $f'$ $f'$ which grasp the sheet at or near its upper edge, these fingers being automatically operated by stationary cams $f^2$ on the frame A of the machine, in conjunction with a deflector device $f^3$ for pushing or deflecting the lower edge of the sheet over the mouth or edge of the chute F' by which the sheet is passed or conveyed to the cleaning device or mechanism. This deflector device $f^3$ consists preferably of a revolving arm mounted on the frame in co-operative relation or combination with the chute F', the carrier $f$ and the cam which opens or permits the opening of the fingers $f'$ $f'$ to release the sheet, so that the deflector device will push or deflect the sheet as it drops into the chute F.

Two endless link chains $f$ are employed, the same being carried on pulleys $f^4$ $f^4$ revolving in opposite directions, so that the two contiguous or inner loops of the two link chains will travel in the same direction and co-operate together, the two chain carriers $f$ $f$ being placed far enough apart to give room for the sheet or sheets of the tin plate to be suspended between them. To properly guide the flexible chain carriers $f$ $f$ the frame A is provided with tracks or ways $f^5$ $f^5$ for each of these chain carriers. The opening and closing movement of the lifting fingers $f'$ $f'$ is provided for by pivoting or hinging the fingers to the carrier, as at $f^6$; and they are closed and held closed so as to properly grasp and support the sheet of tin plate by means of the stationary cams $f^2$, which should preferably be fixed adjustably to the frame A. The movable fingers $f'$ $f'$ are preferably furnished with anti-friction rollers $f^7$ to bear against the stationary cam $f^2$. By this lifting device the sheets of tin plate, as they issue one after another from the finishing rolls $d^2$ $d^2$ of the tinning pot $d$ are grasped at the upper corners of each sheet by the opposite pairs of lifting fingers $f'$ $f'$ on the chain carriers $f$ $f$, and the sheet thus suspended by and between said carriers is conveyed upward for a suitable height and time to give the necessary opportunity for the tin coating to become sufficiently set or cool to prevent marring or injuring by contact with the discharge chute or sheet deflector device; and then, by operation of the stationary cams $f^2$ $f^2$ the lifting fingers are automatically opened and the sheet released, when it descends along the discharge chute F', its lower edge being deflected over the mouth of the discharge chute F' by the deflector device $f^3$.

G is the cleaner device or mechanism. The cleaner device or mechanism may be of any suitable kind or construction known to those skilled in the art, but that which I prefer to employ in my combined machine is indicated in the drawings, and consists essentially of an endless flexible skeleton conveyer $g$ and a bin or receptacle containing bran or other cleaning material through which cleaning material the sheets are drawn or passed successively and continuously by the conveyer $g$.

The skeleton conveyer $g$ consists of link chains traveling upon suitable pulleys, and furnished with a series of open racks, pockets or fingers $g'$ for receiving and holding the tinned sheets and conveying them through the mass of bran or cleaning material in the bin or receptacle G, the racks, pockets or fingers being open so as to permit the mass of bran to come in contact with the surfaces of the loose sheets on both sides.

The connecting chute F' is arranged preferably in substantially the same direction or inclination as the receiving portion or loop of the endless flexible conveyer $g$ of the cleaning mechanism G so that when the tinned sheets pass down to the lower end of the chute F', they will be in the path of the open pockets or fingers $g'$ of the conveyer $g$ and thus be received thereby. The chute F' is provided with one or more, preferably two, spring stops $f^4$ and $f^5$ to cushion the fall or motion of the sheet to prevent injury to the same. The upper one $f^4$ of these stops is mounted on a movable arm $f^6$, so that it may be moved out of the way at intervals to permit the sheet to pass down against the next stop $f^5$ in position to be received by the carrier pocket $g'$. The arm $f^6$ is operated at suitable intervals by a cam or projection $g^3$ $g^4$ on the pulley $g^5$ of the carrier $g$ of the cleaning mechanism. The movable stop $f^4$ thus operates as a feed check or device to prevent more than one sheet being fed or passed at a time down against the stop $f^5$ in position to be received by the carrier of the cleaning mechanism. The stop $f^5$ is preferably made in the form of a spring as indicated in the drawings, and is also secured to a sliding stem $f^7$ which is surrounded and supported by a coil spring $f^8$.

H is the polishing device or mechanism. This polishing device or mechanism may be of any suitable kind or construction known to those skilled in the art, but that which I prefer to employ is indicated in the drawings and consists essentially of a series of felt covered polishing rolls $h$ between which the sheet is fed or passed by the feed rolls $h'$, the rolls being mounted in an inclosing case $h^2$ and the sheets being fed directly and automatically to the polishing device by a chute or passage way $h^3$. From the polishing device the sheets are automatically delivered into a suitable truck or receptacle K by the delivery chute or passage $h^4$.

M is a water tank or receptacle from which the sheets are taken preparatory to being fed to the drying and fluxing device.

All these parts or mechanisms are geared and connected together by suitable driving mechanism so that the sheets pass continuously and successively from the feeder B to the drying and fluxing device C, thence to the tinning device D, thence to the lifting and cooling device F, thence to the cleaning device G, thence to the polishing device H, and finally onto the truck or receptacle K; and as the sheets still retain considerable of their heat while passing through the cleaning and polishing devices, this warmth or heat of the sheets greatly facilitates not only the removal of the oil or grease from the sheets by the cleaning mechanism, but also the final step of polishing the sheets.

The drying and fluxing mechanism herein shown and described is not herein claimed, as it forms the subject of my pending companion application, Serial No. 514,899, filed of even date herewith. The lifting and cooling mechanism herein shown and described is not herein claimed, as it forms the subject of my pending companion application, Serial No. 514,900, filed of even date herewith. The chute F' and the spring stops therein and parts directly connected therewith herein shown and described are not herein claimed, as the same form the subject of the pending application of Horatio N. Norton and myself, Serial No. 514,916, filed of even date herewith.

By "lifting device," "lifting mechanism," or "lifting and cooling device or mechanism," I wish to be understood as meaning a device or mechanism constructed and adapted to take the separate sheets as they issue at intervals one by one from the tinning pot and suspend and convey them in an upright position without marring or injuring their freshly tinned surfaces until the tin upon their surfaces becomes sufficiently set or cool to admit of the sheets being delivered to the discharge chute or to the conveyer of the cleaning device without injury.

I claim—

1. In a tin plate manufacturing apparatus, the combination of the following instrumentalities each constructed and adapted to handle or operate upon loose separate sheets one after another: a device or mechanism for feeding the sheets of steel or iron one by one at intervals automatically, a device or mechanism for drying and fluxing the wet pickled sheets, a device or mechanism for tinning the sheets provided with finishing rolls, a device or mechanism for lifting and supporting or cooling the sheets as they issue from the tinning mechanism, a device or mechanism for cleaning the sheets, and a device or mechanism for polishing the sheets, all combined and cooperating together substantially as specified.

2. In a tin plate manufacturing apparatus the combination of the following instrumentalities each constructed and adapted to handle or operate upon loose separate sheets one after another: a fluxing mechanism, a tinning mechanism provided with finishing rolls, a lifting mechanism arranged to receive the sheets as they issue from the finishing rolls and a cleaning mechanism, substantially as specified.

3. In a tin plate manufacturing apparatus, the combination of the following instrumentalities each constructed and adapted to handle or operate upon loose separate sheets one after another: a sheet feed device, a fluxing device, a tinning device provided with finishing rolls, a chute or passage connecting the fluxing device and tinning device, a sheet lifting and cooling device, a lifting device arranged to receive the sheets as they issue from the finishing rolls a cleaning device and a chute or passage connecting the lifting and cleaning devices, substantially as specified.

4. The combination of a sheet feed device, a fluxing device, a tinning device, a chute or passage connecting the fluxing device and tinning device, a sheet lifting and cooling device, a cleaning device, a chute or passage connecting the lifting device and cleaning device, and a device for deflecting or pushing the sheet after it is released by the lifting device into the chute or passage connecting the lifting and cleaning devices, substantially as specified.

5. In a tin plate manufacturing apparatus, the combination of the following instrumentalities, each constructed and adapted to handle or operate upon loose separate sheets one after another; a tinning mechanism provided with finishing rolls, a lifting device arranged to receive the sheets as they issue from the finishing rolls a cleaning mechanism, a polishing mechanism, and means for automatically delivering the sheets to the cleaning mechanism as they issue from the tinning mechanism, substantially as specified.

6. In a tin plate manufacturing apparatus, the combination of the following instrumentalities each constructed and adapted to handle or operate upon loose separate sheets one after another; a fluxing mechanism, a tinning mechanism provided with finishing rolls, a lifting device arranged to receive the sheets as they issue from the finishing rolls a device or mechanism for cleaning the oil from the tinned sheets, a device or mechanism for polishing the sheets, means for automatically delivering the sheets from the fluxing mechanism to the tinning mechanism, and means for automatically delivering the sheets to the cleaning and polishing mechanism as they issue from the tinning mechanism, substantially as specified.

7. In a tin plate manufacturing apparatus, the combination of the following instrumentalities each constructed and adapted to handle or operate upon loose separate sheets one after another: a device or mechanism for feeding the sheets of steel or iron one by one at intervals automatically, a device or mechanism for drying and fluxing the wet pickled sheets, a device or mechanism provided with finishing rolls for tinning the sheets, a device or mechanism for lifting and supporting or cooling the sheets as they issue from the finishing rolls of the tinning mechanism, and a device for cleaning the sheets, all combined and cooperating together substantially as specified.

8. In a tin plate manufacturing apparatus, the combination of the following instrumentalities, each constructed and adapted to handle or operate upon loose separate sheets one after another; a tinning device provided with finishing rolls, a lifting device arranged to receive the sheets as they issue from the finishing rolls a device or mechanism for cleaning the oil from the tinned sheets, a device or mechanism for polishing the sheets, a chute or passage connecting the cleaning mechanism and polishing mechanism, and means for automatically delivering the sheets to the cleaning mechanism as they issue separately and at intervals from the tinning device, substantially as specified.

9. The combination of a sheet feed device with a fluxing device, a tinning device, a chute or passage for passing or conveying the sheets from the fluxing device to the tinning device, a device for lifting and cooling the sheets as they issue from the tinning device, a cleaning device, a chute or passage for conveying the sheets from the lifting device to the cleaning device, a device for deflecting the sheet into said chute or passage connecting the lifting device and cleaning device, a polishing device, and a chute or passage connecting the cleaning device and polishing device, substantially as specified.

10. In a tin plate manufacturing apparatus, the combination of the following instrumentalities each constructed and adapted to handle or operate upon loose separate sheets one after another; a sheet feed device, a fluxing device, a tinning device provided with finishing rolls, a chute or passage connecting the fluxing device and tinning device, a sheet lifting and cooling device arranged to receive the sheets as they issue from the finishing rolls, a cleaning device, a chute or passage connecting the lifting and cleaning devices, and a polishing device, substantially as specified.

11. The combination of a sheet feed device, a fluxing device, a tinning device, a chute or passage connecting the fluxing device and tinning device, a sheet lifting and cooling device, a cleaning device, a chute or passage connecting the lifting device and cleaning device, a device for deflecting or pushing the sheet after it is released by the lifting device into the chute or passage connecting the lifting and cleaning device, and a polishing device, substantially as specified.

EDWIN NORTON.

Witnesses:
H. M. MUNDAY,
EMMA HACK.